United States Patent [19]

DaDeppo et al.

[11] Patent Number: 5,426,815
[45] Date of Patent: Jun. 27, 1995

[54] WIPER SYSTEM INCLUDING AN ADJUSTABLE ARM LOAD MECHANISM

[75] Inventors: Lynn D. DaDeppo, Birmingham; Xiaoming Deng, Ann Arbor, both of Mich.

[73] Assignee: Ford Motor Company, Dearborn, Mich.

[21] Appl. No.: 272,059

[22] Filed: Jul. 8, 1994

[51] Int. Cl.[6] ............................................. B60S 1/32
[52] U.S. Cl. ............................ 15/250.20; 15/250.35
[58] Field of Search ........... 15/250.20, 250.35, 250.19, 15/250.34, 250.21

[56] References Cited

U.S. PATENT DOCUMENTS

| | | | |
|---|---|---|---|
| 3,788,681 | 1/1974 | Barenyi et al. | 15/250.31 |
| 3,967,340 | 7/1976 | Cmolik | 15/250.42 |
| 4,698,872 | 10/1987 | Watanabe | 15/250.20 |
| 4,718,139 | 12/1988 | Okuda et al. | 15/250.20 |
| 4,750,235 | 6/1988 | Scorsiroli | 15/250.20 |
| 4,932,097 | 6/1990 | Kobayashi et al. | 15/250.34 |
| 5,056,182 | 10/1991 | Fukumoto et al. | 15/250.20 |
| 5,062,175 | 11/1991 | Buchanan et al. | 15/250.20 |
| 5,081,736 | 1/1992 | Schon | 15/250.35 |
| 5,129,123 | 7/1992 | Shirato | 15/250.20 |
| 5,161,280 | 11/1992 | Sumiya et al. | 15/250.20 |

FOREIGN PATENT DOCUMENTS

| | | | |
|---|---|---|---|
| 2928757 | 2/1981 | Germany | 15/250.20 |
| 81750 | 3/1990 | Japan | 15/250.20 |
| 99449 | 4/1990 | Japan | 15/250.20 |
| 241859 | 9/1990 | Japan | 15/250.20 |

*Primary Examiner*—Gary K. Graham
*Attorney, Agent, or Firm*—Daniel M. Stock; Roger L. May

[57] ABSTRACT

An adjustable arm load mechanism for an automotive windshield wiper is provided in which a load-adjusting linkage assembly is provided between the pivot shaft of the windshield wiper assembly and the wiper arm. The linkage assembly includes a cam member operative with a lever to effect variation of the spring load imposed upon the wiper arm in response to reversing reciprocal rotative movement of the pivot shaft so that wiper arm load is reduced at its extreme positions and increased in its intermediate positions.

2 Claims, 2 Drawing Sheets

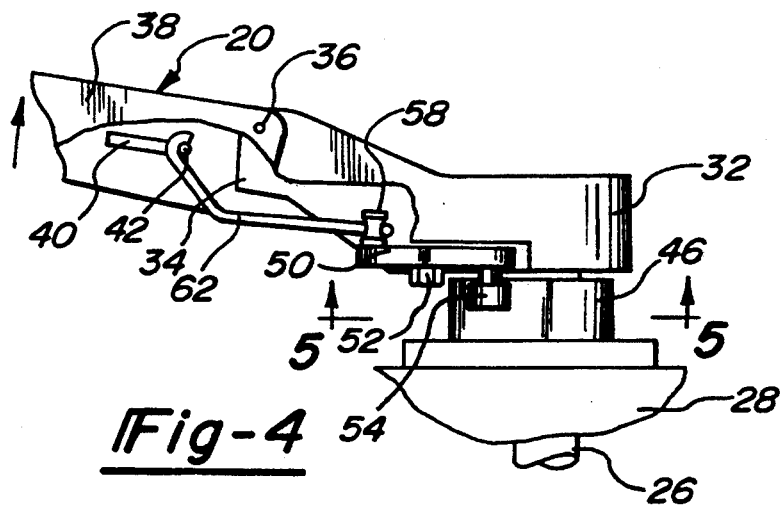
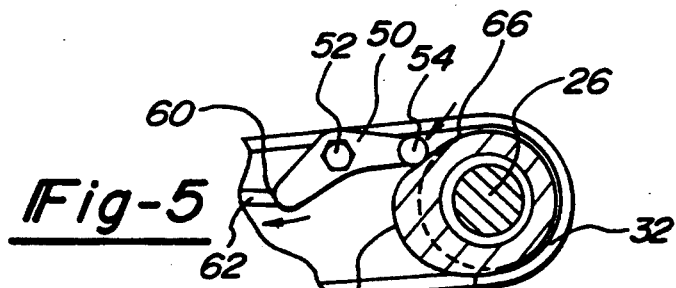
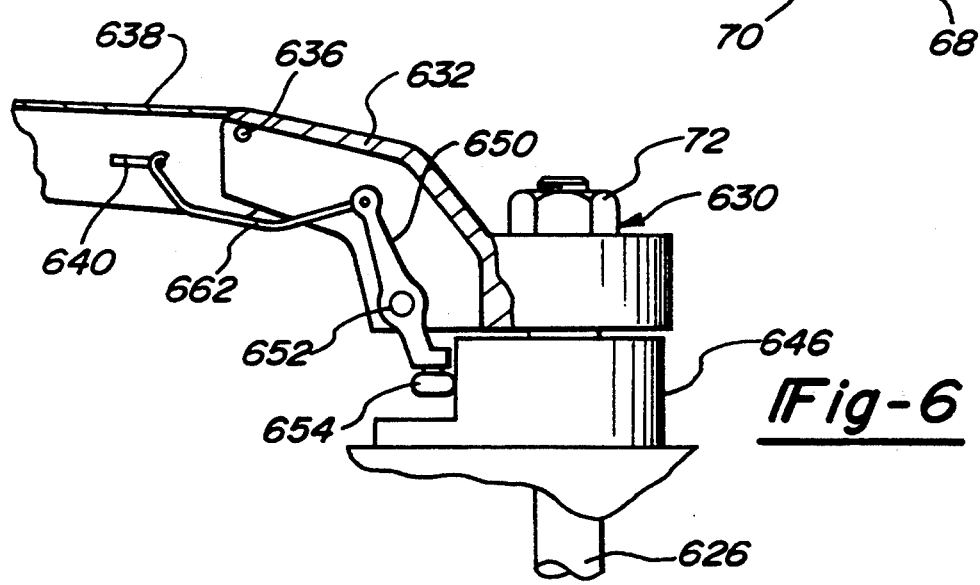

WIPER SYSTEM INCLUDING AN ADJUSTABLE ARM LOAD MECHANISM

BACKGROUND OF THE INVENTION

1. Technical Field

The present invention relates generally to devices for controlling the load imposed by a windshield wiper to the windshield of an automotive vehicle, and more specifically to a mechanism for adjusting such load responsive to reciprocal rotative movement of the windshield wiper driving shaft.

2. Description of the Prior Art

The problems and technical considerations considered in the setting of the forced to be imposed by the wiper arm and a windshield wiper mechanism of an automobile to urge the wiper against the windshield are well appreciated in the prior art. On the one hand, sufficient loading of the wiper is needed to overcome the lifting of the wipers from the windshield surface at high vehicle speeds, while on the other hand providing sufficient load to overcome the tendency of blades to lift the high speed may result in sticking and shattering of the blades under load speed operation where the lift is not present to counterbalance the loading force imposed at assembly.

A variety of approaches have been used in the automotive industry to effect loading of the wiper arm and hence the wiper blade in the direction of the windshield. One of the most common schemes involves the use of an extension spring grounded at one end on the wiper arm and at the other end on wiper structure through which the wiper arm is rotated. To make the force of this spring adjustable in response to the diverse loading requirements referred to above, the industry has made a number of attempts at devising suitable mechanisms exemplary of such attempts as that shown in U.S. Pat. No. 4,698,872 to Watanabe. Such devices have been found to be unsuitably heavy and expensive to manufacture, and the Watanabe device in particular requires subjected evaluation of the load by the operator of the vehicle and actuation of the switch mechanism to effect change in load.

SUMMARY OF THE INVENTION

The aforementioned deficiencies and others are overcome by the adjustable arm load mechanism according to the present invention, which automatically and without outside agency of the operator of the vehicle provides adjustments of the load of the wiper arm in response to movement of the wiper arms so that at the extreme ends of the wiping action when the wiper blade must reverse to reciprocate across the windshield load is reduced while at the center of the wiping stroke the arm load and hence the load of the wiper blade against the windshield may be maximized.

This is accomplished in a mechanism that includes a longitudinally extending pivot shaft that is rotatably reversibly driven with respect to the windshield, a wiper arm head drivingly engaging the pivot shaft for rotation with it, a wiper arm pivotally mounted on the wiper arm head to engage the wiper blade against the windshield, a spring member operatively disposed between the wiper head and the wiper arm, and a load adjusting linkage assembly interposed between the pivot shaft and the spring member to vary the load imposed on the wiper arm between the extreme positions of wipe at which the load is minimum and the position intermediate the extreme positions in which the load is maximum.

BRIEF DESCRIPTION OF THE DRAWINGS

These and other objects and advantages of the present invention will be apparent to those skilled in the automotive windshield wiper arts by reading the following description with reference to the accompanying drawings, in which:

FIG. 4 is another side elevation view similar to FIG. 2 with components in the rotated position;

FIG. 5 is a cross-sectional view taken along line 5—5 of FIG. 4; and

FIG. 6 is a side elevational view of an alternative embodiment.

DESCRIPTION OF THE PREFERRED EMBODIMENT

Figure 1:
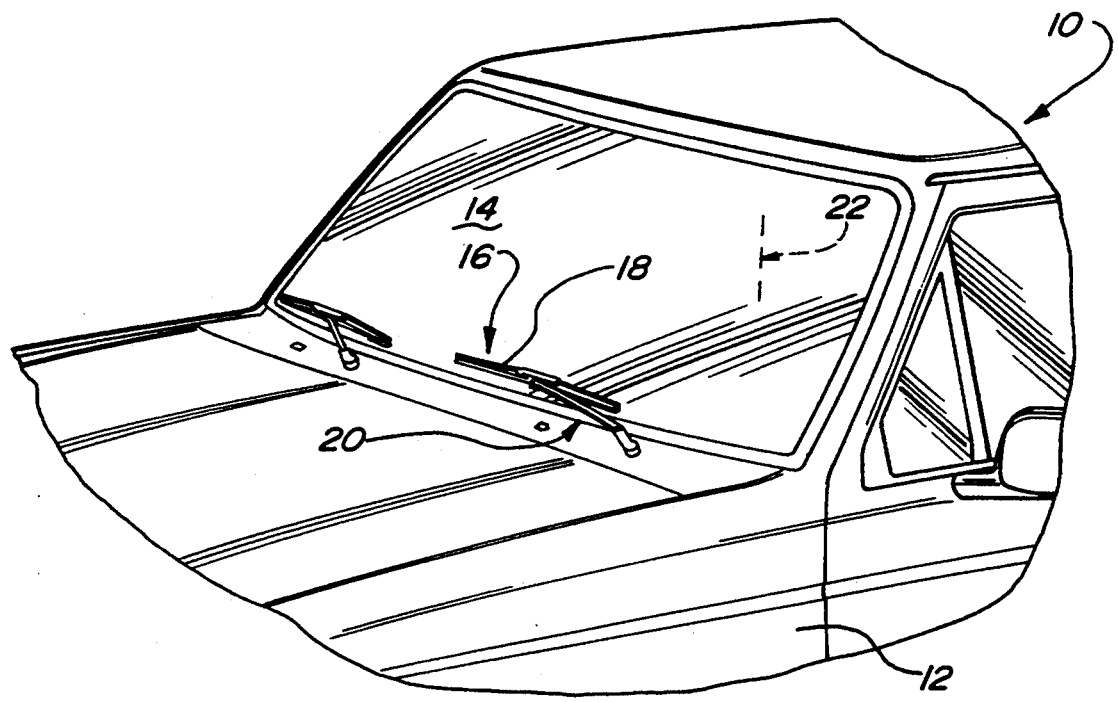
FIG. 1 is a perspective view of an automotive vehicle on which the adjusting mechanism of the present invention is mounted.

Turning now to FIG. 1, an automotive vehicle 10 is illustrated as including a body, indicated generally at 12, in which is mounted a windshield 14. A windshield wiper system, indicated generally at 16, is provided mounted on a portion of the body 12 for cleaning the windshield 14. As is conventional, the windshield wiper system includes a wiper blade assembly, indicated at 18, that is driven through an arm assembly 20 that is driven for reciprocal rotated movement between extreme positions, one being the park position shown in FIG. 1, the other being a position moved clockwise with respect to a position approximately located as indicated by the numeral 22 in FIG. 1. According to the present invention, the arm assembly 20 is mounted to provide minimum loading of the wiper 18 against the windshield 14 at the two extreme positions while providing a maximum loading at a point intermediate those two positions.

Figure 2:
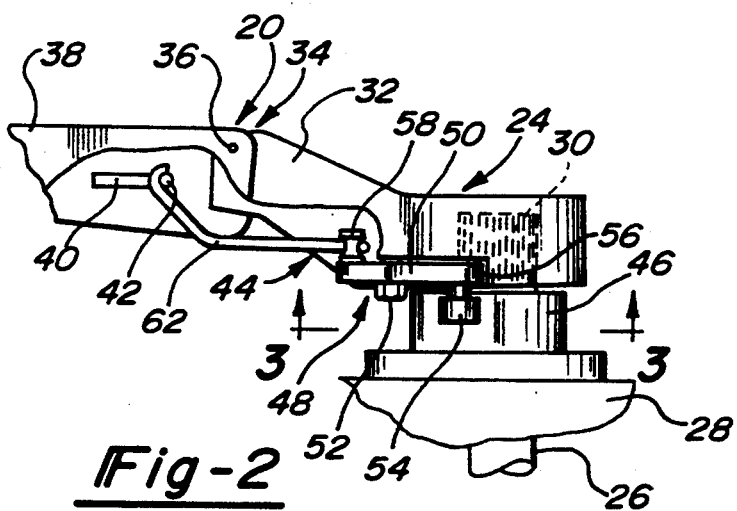
FIG. 2 is a side elevation view of an adjustable arm load mechanism according to the present invention.

Turning next to FIGS. 2 through 5, a preferred embodiment of an adjustable arm load mechanism 24 according to the present invention is illustrated. The adjustable arm load mechanism 24 is illustrated as including a pivot shaft 26 carried in a pivot housing 28 and having a drive end 30 at its end. The drive end 30 is illustrated in FIG. 2 as comprising a spline connection, but those skilled in the art will appreciate that other drive connections may be substituted. Complementary structure to the drive end 30 is provided in a wiper arm head 32 so that reciprocal rotative movement of the pivot shaft 26 effects following movement of the wiper arm head 32. At an end of the wiper arm head 32, indicated at 34, displaced from the longitudinal axis of the pivot shaft 26, a pivotal connection 36 is effected to the longitudinally extending wiper arm 38. A spring member 40, preferably an extension spring, is carried within the wiper arm 38 and is grounded in a portion of the wiper arm 38 remote from the pivotal connection 36 through conventional mechanism (not shown). The inner end 42 of the spring member 40 is operatively connected to a load-adjusting linkage assembly, indicated generally at 44, which is operatively disposed between the spring member 40 and the pivot shaft 26.

Figure 3:
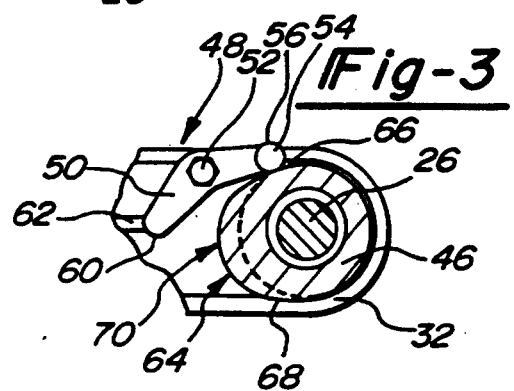
FIG. 3 is a cross-sectional view taken along line 3—3 of FIG. 2.

The load-adjusting linkage assembly 44 is illustrated as including a cam member 46 carried in surrounding relationship with respect to pivot shaft 26, as may best seen in FIGS. 3 and 5, and a lever assembly 48.

The lever assembly 48 includes a lever 50 being mounted for pivotal movement to the wiper arm head 32 as by the bolt indicated at 52. The lever 50, in the configuration shown in FIG. 2, is mounted for movement about an axis generally parallel to the axis of the pivot shaft 26 and includes a depending follower member, indicated at 54, which may be rotatably mounted at one end 56 of the lever 50. A hook receiving pin 58 is illustrated as standing upwardly from the lever 50 at the end 60 opposite the end 56, and a connecting wire 62 extends between the pin 58 and the end 42 of the spring member 40.

During operation, as the pivot shaft 26 is rotatably reciprocally driven, the load adjusting linkage assembly 48 is carried for movement with the wiper arm head 32 so that the follower 54 abuttingly engages the outer surface 64 of the cam member 46 continually urged against it by the tension load of the spring member 40. As the follower 54 continues along the surface 64, its position with respect to the center of the pivot shaft 26 varies between two extreme positions indicated at 66, 68 closest to the pivot shaft 26 center and the position indicated generally at 70 most remote therefrom. Movement between the positions 66, 68 and the position 70 effects pivotal movement of the link 50 and extension of the spring member 40 increasing the load imposed by the spring. Since, as is illustrated in FIG. 2, the spring effects loading on the arm assembly 20 below the pivotal connection 36, this effects greater loading of the wiper blade 18 against the windshield 14 of the automotive vehicle 10. The positions 66, 68 on the cam member 46 are configured to correspond to the park position shown in FIG. 1 and the extreme position 22 shown in FIG. 1, since at these points the attitude of blade 18, with respect to the windshield 14, must reverse for reversing movements of the blade 18. The cam configuration shown reduces loading in a desirable fashion. This tends to effect reduction in the noise of the wiper blade during reversal. The maximization of loading corresponding to the cam position 70 effects an increase in loading desirable during the major portion of the sweep of the wiper arm assembly 20 to effect sufficient loading to counteract high speed lift and to ensure good quality wiping of the windshield by the blade 18.

Turning next to FIG. 6, an alternative embodiment is illustrated in which like numbers preceded by the numeral 6 are used to signify parts like those described with respect to FIGS. 2-5 configuration. The embodiments essentially differ in two respects. One is in the way mounting of the load-adjusting linkage assembly is mounted to the wiper arm heads, and the way in which driving connection is effected between the wiper arm heads and the pivot shaft.

As to the latter, a drive connection 530 is illustrated as including a nut and bolt connection 72 that may include conventional drive connections (not shown) for effecting driving connection between the pivot shaft 526 and the arm head housing 532. The load-adjusting linkage assembly 544 is illustrated as including a depending follower 554 rotatable about an axis 74 parallel to the pivot axis while the adjusting link member 550 is pivotally mounted by pin 76 for movement about an axis generally perpendicular to the axis of the pivot shaft 526. In the configuration of the first described embodiment, it is clearly more vertically compact as shown in these views. However, it is appreciated that in certain applications, the packaging and mechanical loading requirements of an application may make the FIG. 6 configuration more optimal.

While only two embodiments of the present invention have been shown and described, others may occur to those skilled in the automotive windshield wiper arts without departing from the scope of the following claims.

What is claimed is:

1. A windshield wiper systems including an adjustable arm load mechanism, said system for wiping an automotive vehicle windshield, said system comprising:
   a longitudinally extending pivot shaft carried in a pivot housing and rotatably reversibly driveable about a pivot axis for movement between a first position and a second position with respect to the windshield;
   an elongated wiper arm head having one end fixed to the pivot shaft for rotation therewith;
   a longitudinally extending wiper arm pivotally mounted on the other end of the wiper arm head and having a wiper blade mounted thereon for engagement against the windshield;
   an elongated spring member operatively connected at a first end to the wiper arm and at a second end to the wiper arm head to resiliently urge the wiper blade against the windshield; and
   a load-adjusting linkage assembly having:
      a cam member mounted on the pivot housing, said cam member having an outer peripheral surface surrounding the pivot shaft;
      a lever assembly comprising an elongated member having a first end slidingly engaging the peripheral surface of the cam member and a second end opposite the first end connected to the second end of the spring member, and wherein the link assembly is carried for rotation with the wiper arm head and pivotally mounted thereto on an axis parallel to the pivot shaft pivot axis intermediate the first and second ends of the elongated member and intermediate the wiper arm head and the cam member to effect load producing extension of the spring member upon movement of the pivot shaft between the first and second positions.

2. An adjustable arm load mechanism as defined in claim 1 wherein the first and second positions correspond to extreme displacement positions of the wiper arm whereby the load imposed on the wiper arm in the first and second positions diminishes.

* * * * *